(12) United States Patent
Marovets

(10) Patent No.: US 11,509,614 B2
(45) Date of Patent: Nov. 22, 2022

(54) METHOD AND SYSTEM FOR IMAGE SHARING AND FEEDBACK

(71) Applicant: Jack L. Marovets, Cedar Rapids, IA (US)

(72) Inventor: Jack L. Marovets, Cedar Rapids, IA (US)

( * ) Notice: Subject to any disclaimer, the term of this patent is extended or adjusted under 35 U.S.C. 154(b) by 425 days.

(21) Appl. No.: 15/014,835

(22) Filed: Feb. 3, 2016

(65) Prior Publication Data

US 2016/0226805 A1 Aug. 4, 2016

Related U.S. Application Data

(60) Provisional application No. 62/111,175, filed on Feb. 3, 2015.

(51) Int. Cl.
| | |
|---|---|
| *H04L 51/10* | (2022.01) |
| *H04L 67/306* | (2022.01) |
| *G07C 13/00* | (2006.01) |
| *G06Q 20/06* | (2012.01) |
| *H04L 67/1095* | (2022.01) |
| *H04L 51/52* | (2022.01) |

(52) U.S. Cl.
CPC .......... *H04L 51/10* (2013.01); *G06Q 20/06* (2013.01); *G07C 13/00* (2013.01); *H04L 51/52* (2022.05); *H04L 67/1095* (2013.01); *H04L 67/306* (2013.01)

(58) Field of Classification Search
CPC ....... H04L 51/10; H04L 51/32; H04L 67/306; H04L 67/1095; H04L 51/52; G06Q 20/06; G07C 13/00

USPC .......................................................... 709/206
See application file for complete search history.

(56) References Cited

U.S. PATENT DOCUMENTS

| | | | |
|---|---|---|---|
| 8,645,844 B1* | 2/2014 | Strobel | G07F 17/3225 715/751 |
| 9,123,074 B2* | 9/2015 | Jacobs | G06Q 30/02 |
| 10,025,491 B2* | 7/2018 | Lerner | G07C 13/00 |
| 10,489,747 B2* | 11/2019 | Ryder | G06Q 30/0269 |
| 2002/0198777 A1 | 12/2002 | Yuasa | |
| 2006/0036508 A1* | 2/2006 | Fry | G06Q 10/02 705/5 |
| 2006/0160597 A1* | 7/2006 | Wright | G07F 17/32 463/16 |
| 2007/0044639 A1 | 3/2007 | Farbood et al. | |
| 2007/0143182 A1 | 6/2007 | Faber et al. | |
| 2007/0298874 A1* | 12/2007 | Baerlocher | G07F 17/32 463/27 |
| 2008/0010319 A1 | 1/2008 | Vonarburg et al. | |
| 2009/0287545 A1 | 11/2009 | Albright | |
| 2010/0228617 A1* | 9/2010 | Ransom | G06Q 30/0236 709/204 |

(Continued)

*Primary Examiner* — Kristie D Shingles
(74) *Attorney, Agent, or Firm* — Goodhue, Coleman & Owens, P.C.

(57) ABSTRACT

A method for providing a service for image sharing and feedback is provided. The method includes providing a software application to execute on a computing device wherein the software application includes a photo war component and a photo contest component. The photo war component provides for presenting users multiple photos and receiving a selection of one of the multiple photos and the photo contest component provides for presenting users with multiple photos and receiving votes or likes for the photo.

11 Claims, 23 Drawing Sheets

(56) References Cited

U.S. PATENT DOCUMENTS

| | | | |
|---|---|---|---|
| 2011/0066444 A1* | 3/2011 | Fish | G06Q 30/02 |
| | | | 705/1.1 |
| 2011/0208852 A1* | 8/2011 | Looney | G06Q 20/10 |
| | | | 709/223 |
| 2011/0223891 A1* | 9/2011 | Kovach | G06Q 10/06 |
| | | | 455/414.1 |
| 2011/0269548 A1* | 11/2011 | Barclay | G07F 17/32 |
| | | | 463/42 |
| 2012/0015711 A1* | 1/2012 | Belisle | G07F 17/3276 |
| | | | 463/25 |
| 2012/0028232 A1* | 2/2012 | Findlay | G06Q 10/06 |
| | | | 434/362 |
| 2012/0268612 A1* | 10/2012 | Wang | G06K 9/00624 |
| | | | 348/207.1 |
| 2013/0073366 A1* | 3/2013 | Heath | G06Q 30/0261 |
| | | | 705/14.25 |
| 2013/0173753 A1 | 7/2013 | Marovets | |
| 2014/0228125 A1* | 8/2014 | Tsang | A63F 13/798 |
| | | | 463/42 |
| 2014/0324629 A1* | 10/2014 | Jacobs | G06Q 30/02 |
| | | | 705/26.41 |
| 2015/0154167 A1* | 6/2015 | Arhin | G06Q 30/0201 |
| | | | 715/233 |
| 2015/0195314 A1* | 7/2015 | Reed | G06Q 50/01 |
| | | | 709/204 |
| 2015/0215373 A1 | 7/2015 | Marovets | |
| 2015/0221161 A1* | 8/2015 | Reid | G06Q 10/06 |
| | | | 463/17 |
| 2016/0124964 A1* | 5/2016 | Caicedo | G06F 17/30256 |
| | | | 707/734 |
| 2017/0316517 A1* | 11/2017 | Shunock | H04L 63/105 |

* cited by examiner

METHOD AND SYSTEM FOR IMAGE SHARING AND FEEDBACK

PRIORITY STATEMENT

This application claims priority to provisional application No. 62/111,175, filed Feb. 3, 2015, hereby incorporated by reference in its entirety.

FIELD OF THE INVENTION

The present relates to image sharing and/or feedback. More specifically, but not exclusively, the present invention is a technological invention which provides for photo wars, photo contests, and/or other methods for sharing or providing feedback.

BACKGROUND OF THE INVENTION

Photo sharing is common amongst many different types of social media platforms including FACEBOOK, INSTAGRAM, and the like. Yet new and innovative ways of sharing photos and receiving feedback regarding photos or other content are needed which incentivizes users to share and also incentivizes users to participate by viewing and giving feedback on photos.

SUMMARY

Therefore, it is a primary object, feature, or advantage to improve over the state of the art.

It is a further object, feature, or advantage to provide a method of photo sharing which allows users with multiple ways to evaluate their photos.

It is a still further object, feature, or advantage to provide a method of photo sharing which includes photo contests and photo wars.

Another object, feature, or advantage is to provide a method of system which is fun and entertaining to use.

Yet another object, feature, or advantage is to provide a system which promotes competition between those who submit content.

A still further object, feature, or advantage is to provide a system which encourages users to participate in multiple ways.

Another object, feature, or advantage of the present invention it to provide a platform which provides an opportunity to receive additional Likes on other social media platforms.

A still further object, feature, or advantage of the present invention is to provide a platform which rewards users for their participation.

Yet another object, feature, or advantage of the present invention is to provide ornamental designs for screen displays associated with software applications including mobile applications.

Another object, feature, or advantage is to integrate with an existing social media platform or image sharing platform such as Instagram so as not duplicate storage of media.

One or more of these and/or other objects, features, or advantages of the present invention will be apparent from the specification and claims that follow.

According to one aspect, a method for providing a service for image sharing and feedback is provided. The method includes providing a software application to execute on a computing device wherein the software application includes a photo war component and a photo contest component. The photo war component provides for presenting users to multiple photos and receiving a selection of one of the multiple photos and the photo contest component provides for presenting users with multiple photos and receiving votes or likes for the photo.

According to another aspect, a method for providing a platform for image sharing and feedback is provided. The method includes providing a software application to execute on a computing device wherein the software application provides for receiving an image from the user, assigning an initial number of chances for the photo, presenting the photo with at least one other photo to other users in a photo war and receiving a selection of the photo or a selection of one of the at least one other photo. If the photo is selected then the method provides for increasing the number of chances for the photo and if one of the at least one other photo is selected decreasing the number of chances for the photo. If the number of chances is reduced to zero then the method provides for removing the photo from the photo war.

Various figures set forth herein include ornamental designs for displays incorporated into or otherwise associated with computing devices. It is to be understood that any portion or combination of portions of the screen display shown in a single figure may constitute a different ornamental design with other portion(s) of the screen display not constituting portions of the ornamental design.

DETAILED DESCRIPTION

The present invention relates to a service which may be provided in different forms including through a software application or "app" which may be associated with a mobile device such as a phone or tablet or with other types of computing devices. The software application may be written in code which is native to a particular type of computing device such as a native iOS app or a native Android app or the software application may be written in code which is interpretable by a web-browser such as an HTML5 (or higher) app. The software may be stored on a computer readable non-transitory storage medium. Management functions may be provided through a web site associated with one or more servers which allow an administrator to make modifications to data such as data stored in one or more databases which is accessed by apps using the service.

Figure 1:
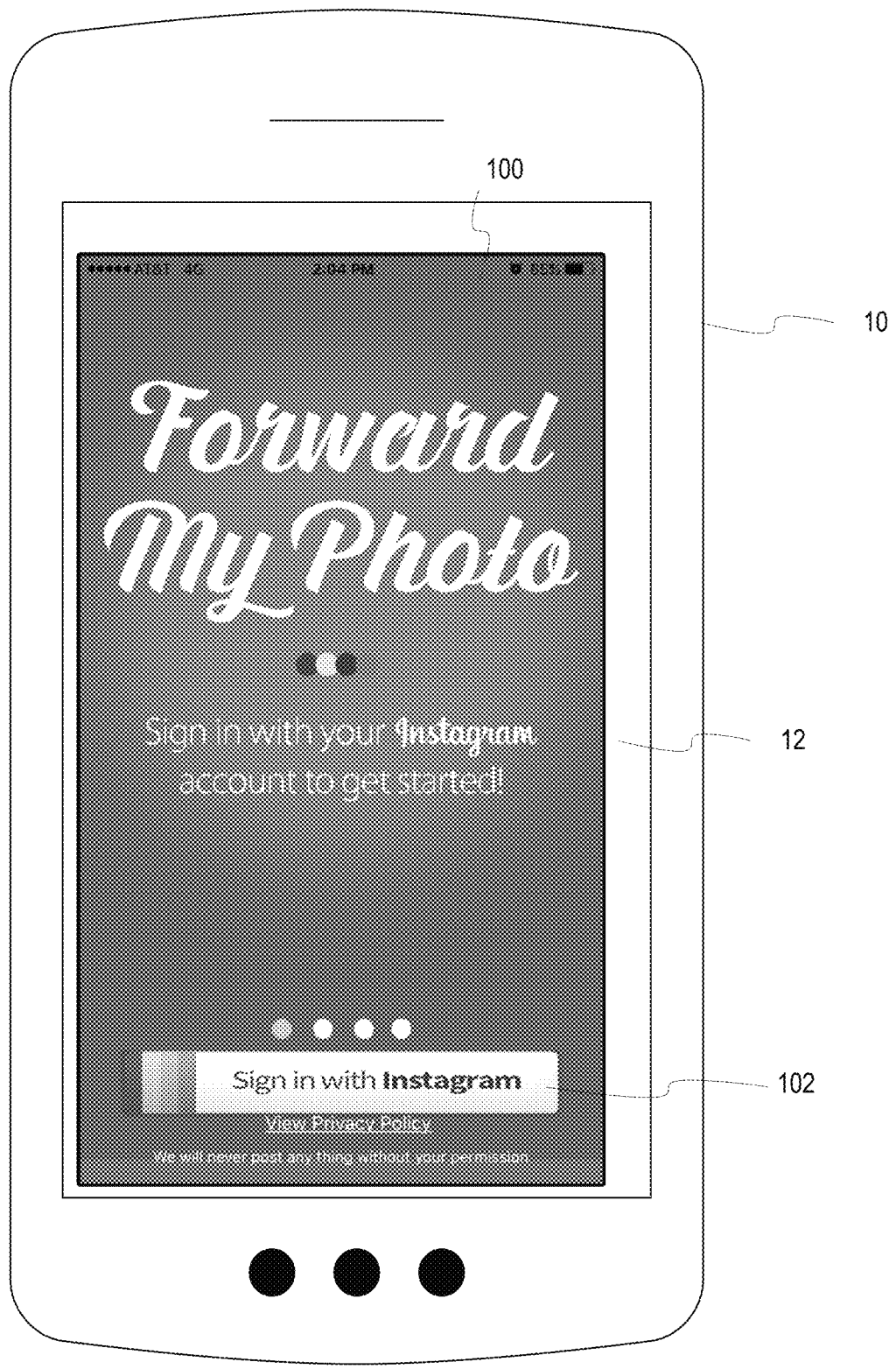
FIG. 1 is a representation of a screen on a mobile device associated with an app.

FIG. 1 is a representation of a mobile device 10 such as a cell phone, tablet, or other mobile device which has a display 12 wherein the mobile device includes a processor for executing instructions of an app. The screen display 100 includes a button 102, which a user can select to indicate an intent to log-in to the app.

Figure 2:
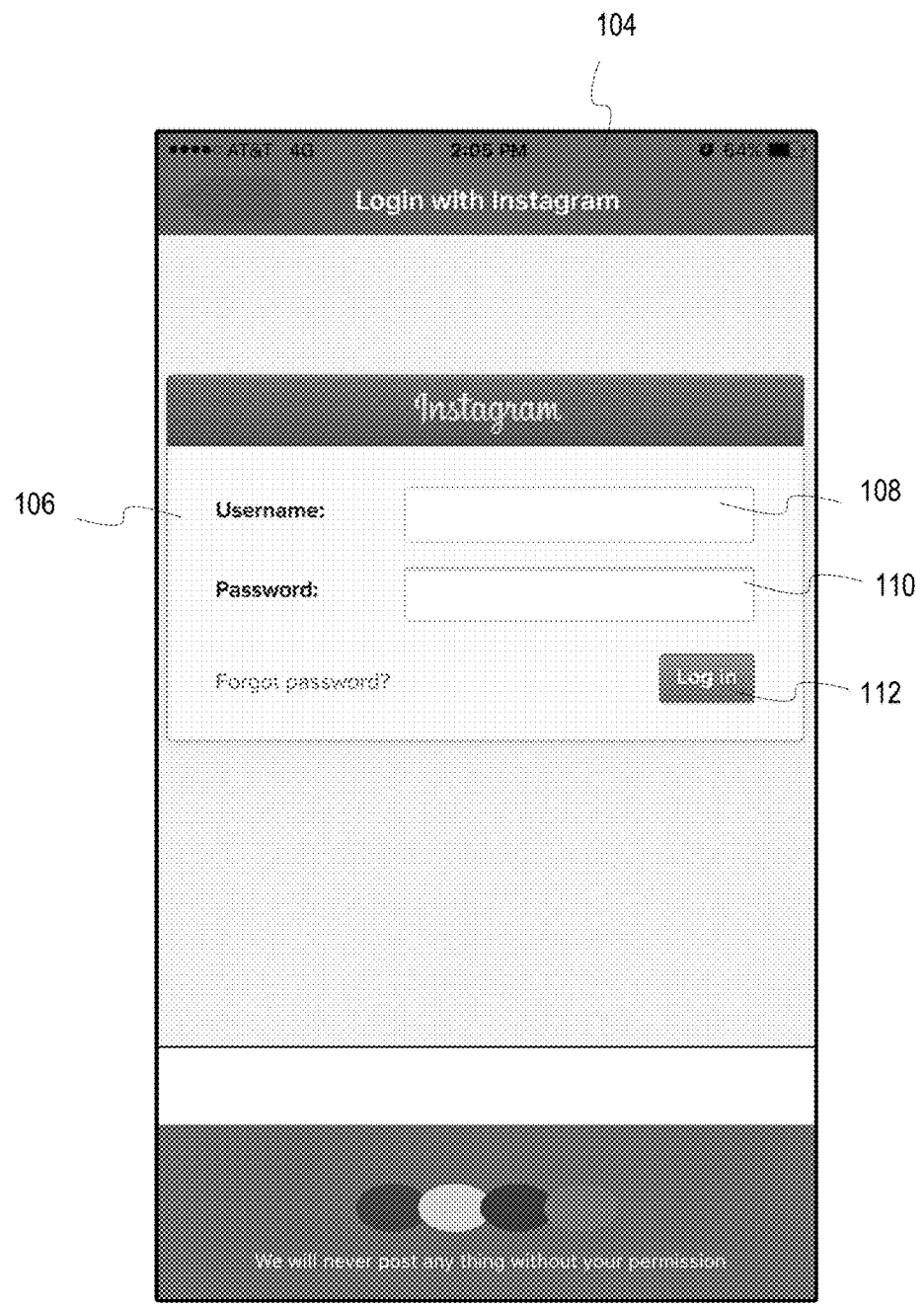
FIG. 2 is a representation of a log-in screen on a mobile device associated with an app.

FIG. 2 is a representation of a log-in screen 104 on a mobile device associated with an app. A window 106 is shown. A user can enter their username within the username field 108, their password within the password field 110, and then select a log-in button 112.

In one embodiment, an Instagram API is used and thus the username and password used to log-into the app are the same as for the user's Instagram account. Where there is integration with Instagram, photos may be stored on the Instagram account as will be explained later in more detail.

Figure 3:
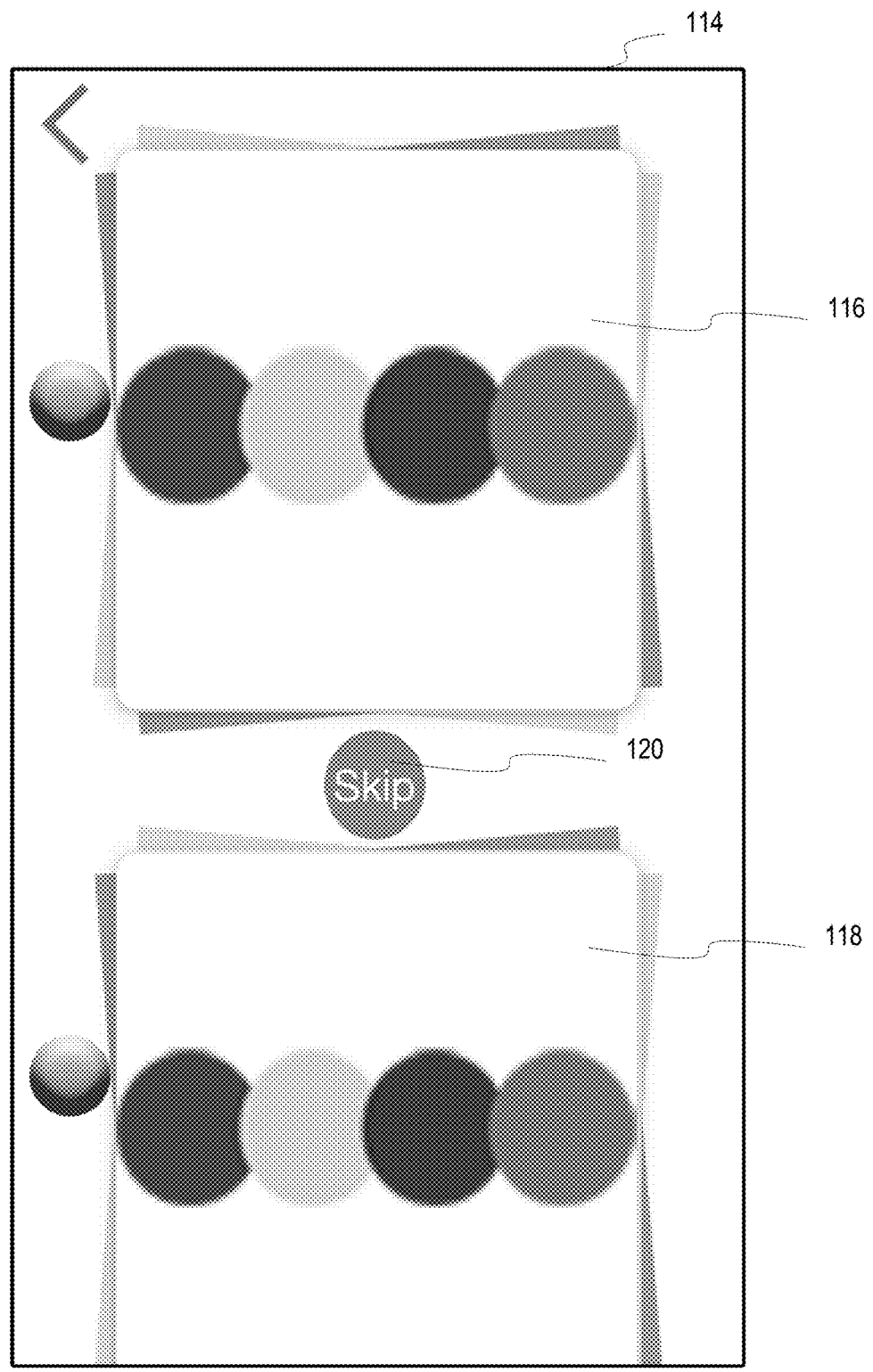
FIG. 3 is a representation of a screen display for a photo war.

FIG. 3 is a representation of a screen display 114 for a photo war according to one aspect. The photo war is where photos 116, 118 are paired against each other for the purpose of seeing which photo is better. If the user does not want to vote, the user has the ability to select the skip button 120 to skip the opportunity to vote on his pairing. This screen 114 is one of the screens were voters can go to vote and gain coins. Although voting can be performed in various ways, one method of voting is to have the user simply select either photo 116 or photo 118 to cast their vote. Each voter will add one coin to a voter's profile (although other quantities of coins may be used instead). The winner of the photo war will get a like on Instagram and a vote on the application which in one embodiment is named ForwardMyPhoto or FMP. Each time a user votes on a photo on any screen in FMP they will receive one coin. The winner of this contest will gain 1 vote on FMP and 1 "Like" on their Instagram account. If the photo 116 starts with 20 chances, then the photo 116 can gain Votes/Likes until it has not been selected 20 times. Then that photo only will exist on the contest side of the app. The uploader can add more likes until the contest ends; also they can upload the same photo as many times as they choose. If the uploader wants to upload the same photo after the contest ended they will have to purchase more chances.

Figure 4:
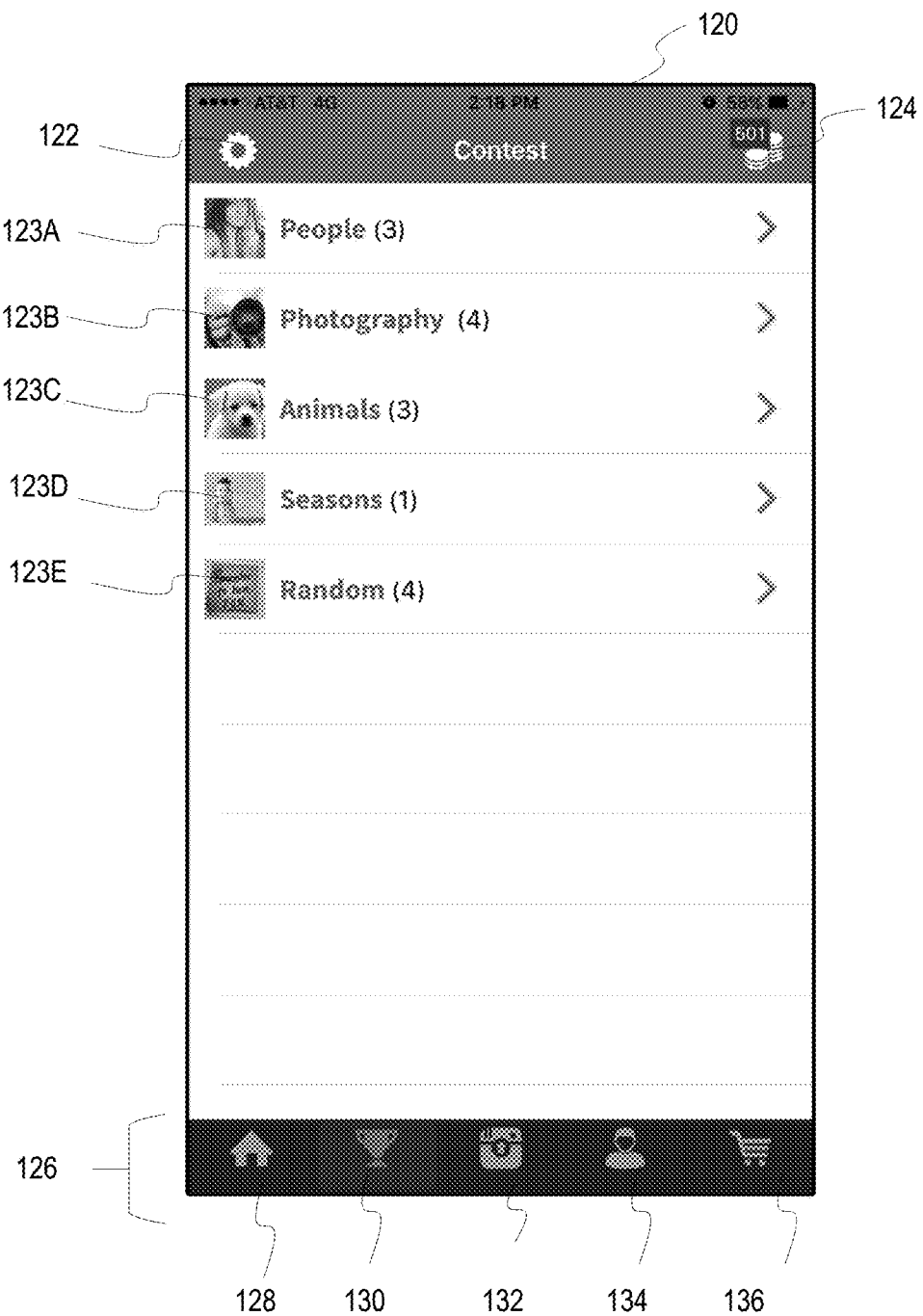
FIG. 4 is a representation for a screen display for selecting a contest where various parent categories are shown including "People", "Photography", "Animals", "Seasons", and "Random."

FIG. 4 is a representation for a screen display 120 listing various contest categories. Different parent categories are shown such as "People", "Photography", "Animals", "Seasons", and "Random." Note that the coins 124 associated with a user's profile are shown in the upper right portion of the screen display. At the bottom of the screen display is a ribbon 126 which includes a home icon 128, a contest icon 130, an Instagram icon 132, a user icon 134, and a shopping cart icon 136. The various icons may be used for navigation within the app. A settings icon 122 is also shown in an upper left portion of the screen display.

Figure 5:
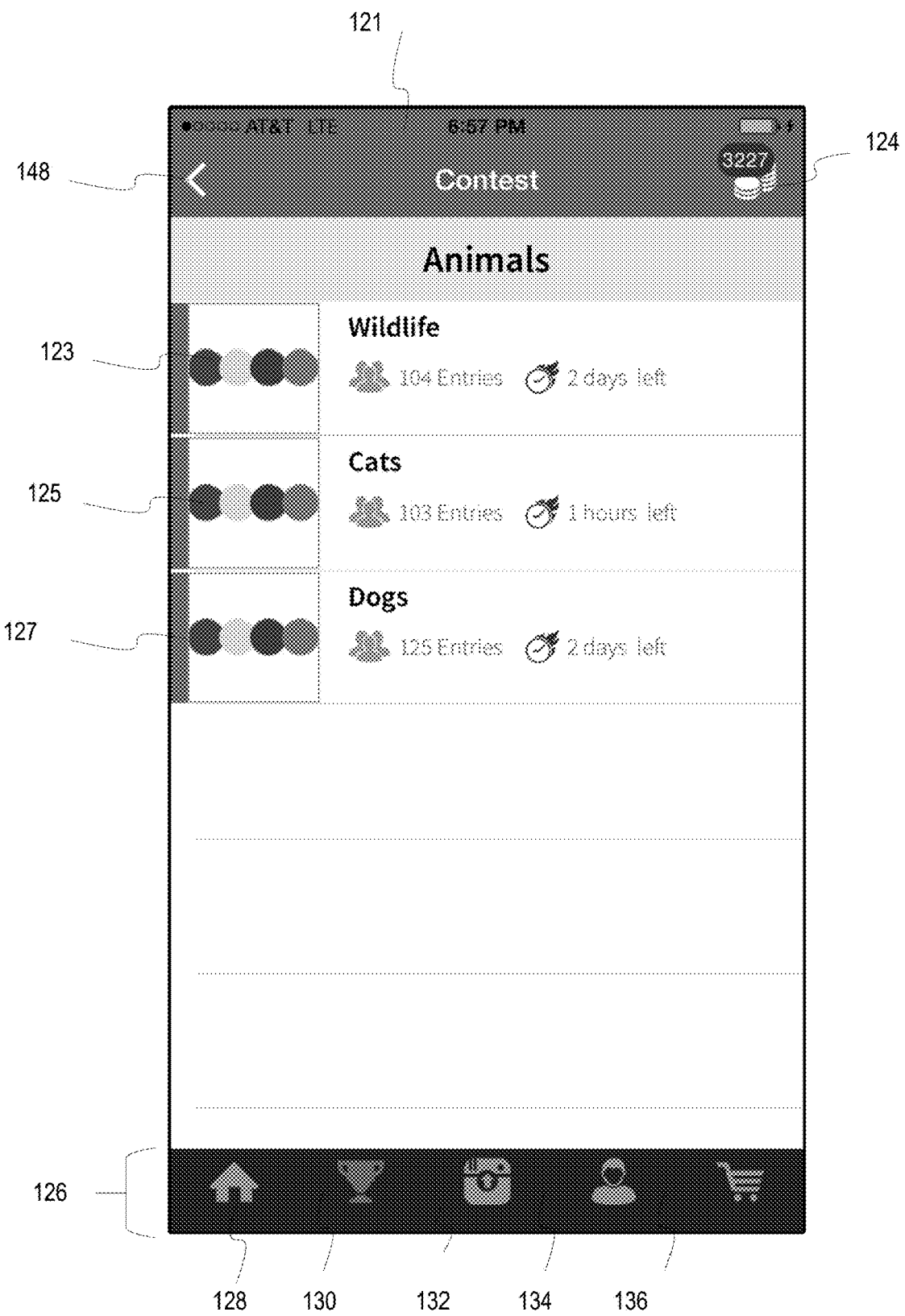
FIG. 5 is a representation of a screen display for selecting a contest where a parent category of "Animals" is shown and subcategories, "Wildlife", "Cats", and "Dogs" are shown.

FIG. 5 is a representation for a screen display 121 listing various contest categories, including a contest where the parent category is "Animals" and the sub-categories are "Wildlife" 123, "Cats" 125, and "Dogs" 127. When a user uploads photo, that photo will be available and used for both the Photo War and the Contest. Voters can vote on the photo in both locations. The screen display 121 shows the different contests. The contests are organized by their Parent Category which is Animals and the Subcategories. Also the number of entries for each subcategory is shown, and the time limit left for the contest. A user can select Back 148 to return to a previous screen for selecting a different category. Alternatively, the user can select the desired subcategory. It is contemplated that additional levels of subcategories may be used if desired.

Figure 6:
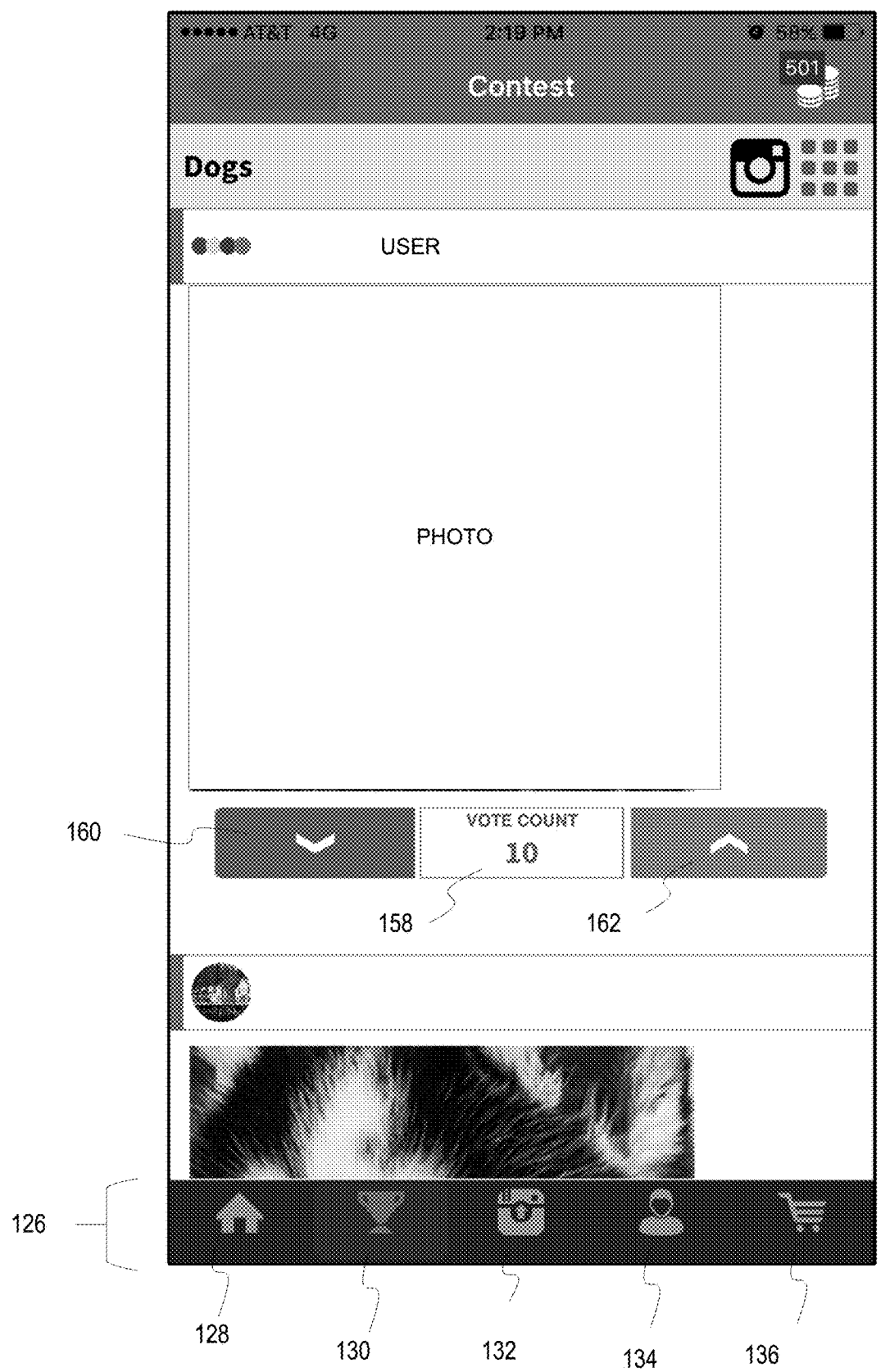
FIG. 6 is a representation of a screen display showing a photo contest where the photo can be voted up or down.

FIG. 6 is a representation of a screen display for a contest where a photo of a puppy can be voted up or down. As shown in FIG. 6, the user can then select "Down" 160 or "Up" 162 to vote. A total vote count 158 is also shown.

Thus, on this screen the voters will be able to vote on the single photo within the contest and see how many votes the photo currently has. Each voter will be able to vote only once. By selecting the green arrow 162 one vote will be added to the number and on Instagram the photo will gain one like. By selecting the red arrow 160 one vote will be taken away; however this will not take a like on Instagram. As long as the contest runs, the votes are tied together meaning if 10 voters like the photo and 20 voters do not like the photo the number of votes will be reduced by 10. In other words, the vote count is the difference of the sum of all up votes and the sum of all down votes. When a voter votes on this screen they will gain a coin for each vote regardless of how they vote.

Figure 7:
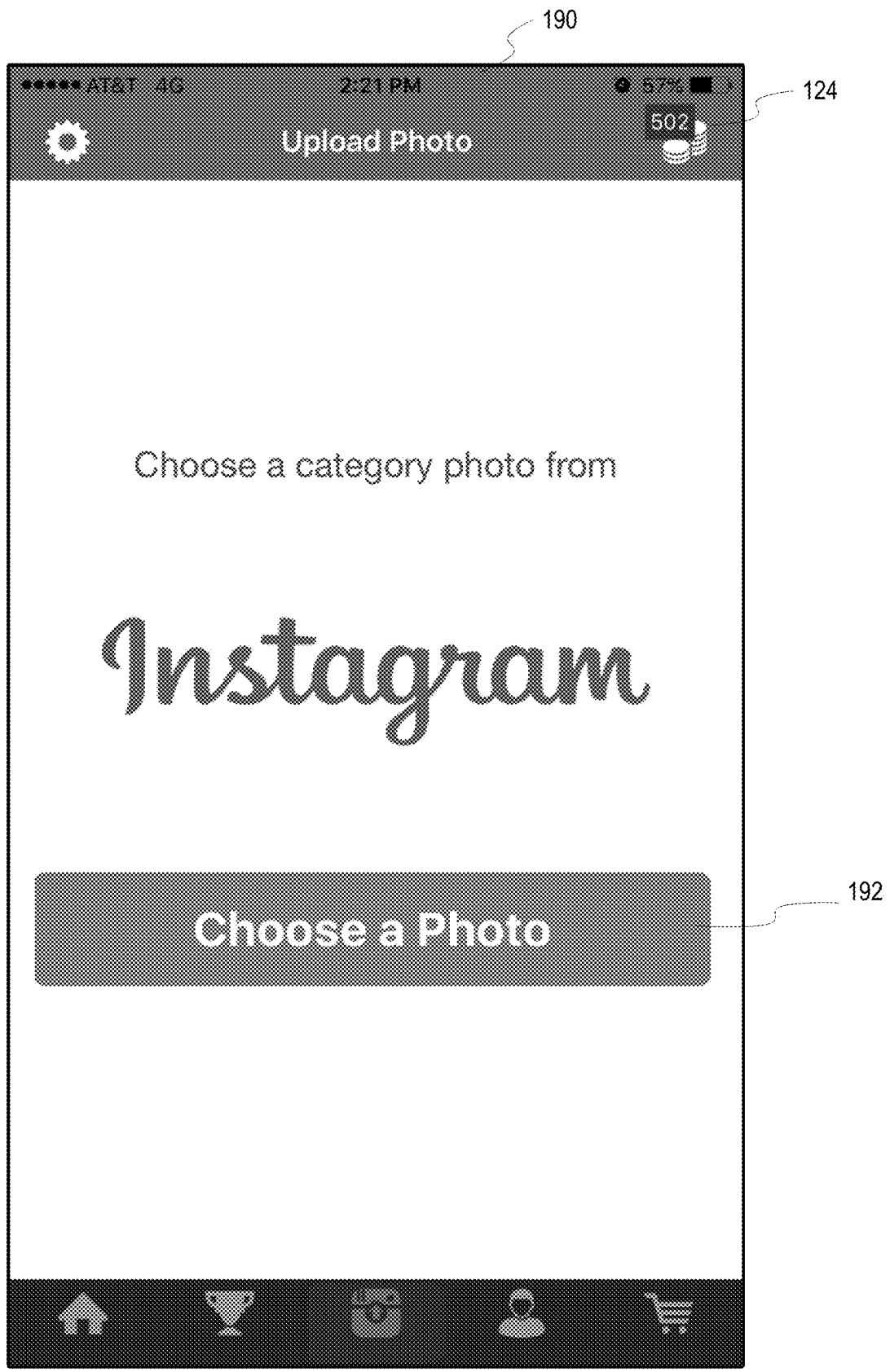
FIG. 7 is a representation or a screen display which is used when a user is ready to upload a photo.

FIG. 7 is a representation of a screen display 190, which is used when a user is ready to upload a photo. A button 192 is shown which allows the user to select a photo. Note that at the top a number of coins 124 is shown.

Figure 8:
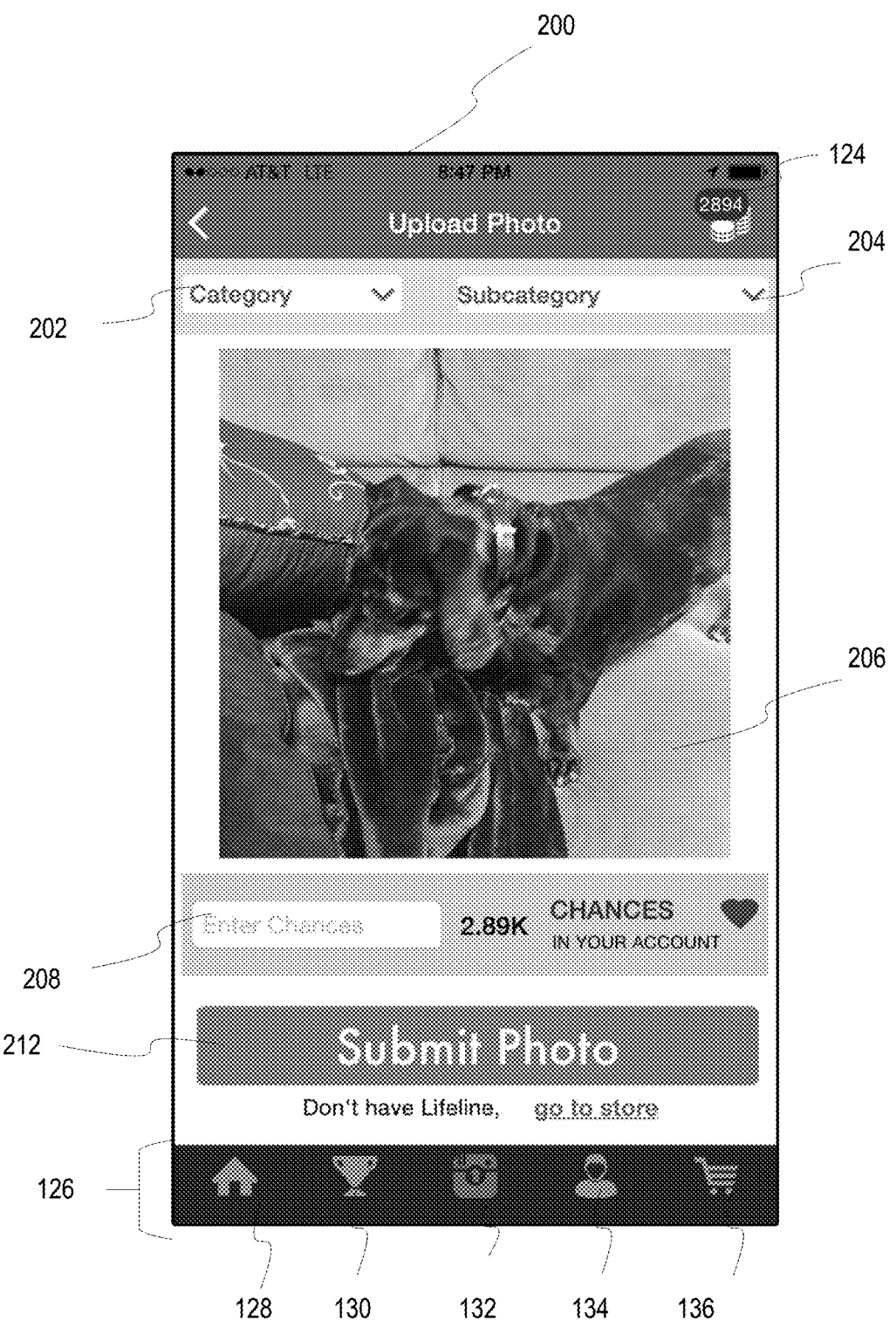
FIG. 8 is a representation of a screen display which is used to allow a user to select categories and upload a photo.

FIG. 8 is a representation of a screen display 200 which is used to allow a user to select categories and upload a photo. The screen display 200 shows the parent categories that are available to the user. When a user has selected a photo they want to upload they may then select a category 202 and subcategory 204. For the photo 206 it will be the parent category (Animals) 202 and the subcategory (Dogs) 204 then they will have to enter the number of chances 208 they want to give the photo 206. On the photo there is the number "2.89k" that is the number of chances available in the users account. The number of chances may correspond with the number of coins on a one-to-one basis or else the number of chances may be a multiplier (greater than one or less than one) of the number of coins. The number of coins per chance can be adjusted using the Adm in Panel as will be described later herein. The ability to adjust the coins per chance may be used to balance the number of coins and users. There is also a link to the store so that if the user does not have enough coins available they can buy additional coins. The photo 206 may then be submitted by selecting the "Submit Photo" button 212.

Figure 9:
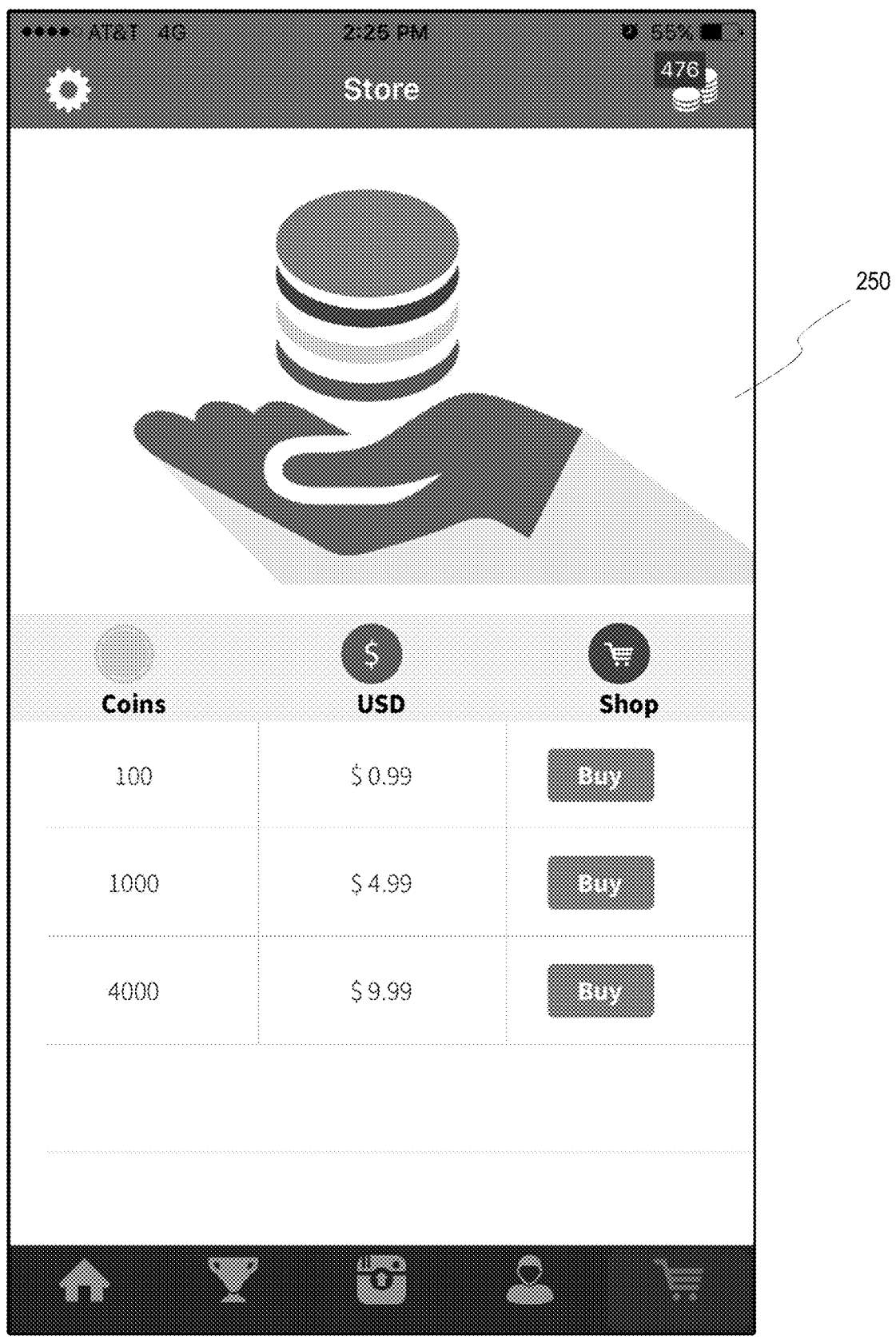
FIG. 9 is a representation of a screen display which illustrates a store.

FIG. 9 is a representation of a screen display 250 which illustrates a store. A user can buy different packages for different prices. The different prices and the amount of coins in a package can be determined using the Adm in Panel later discussed herein.

Figure 10:
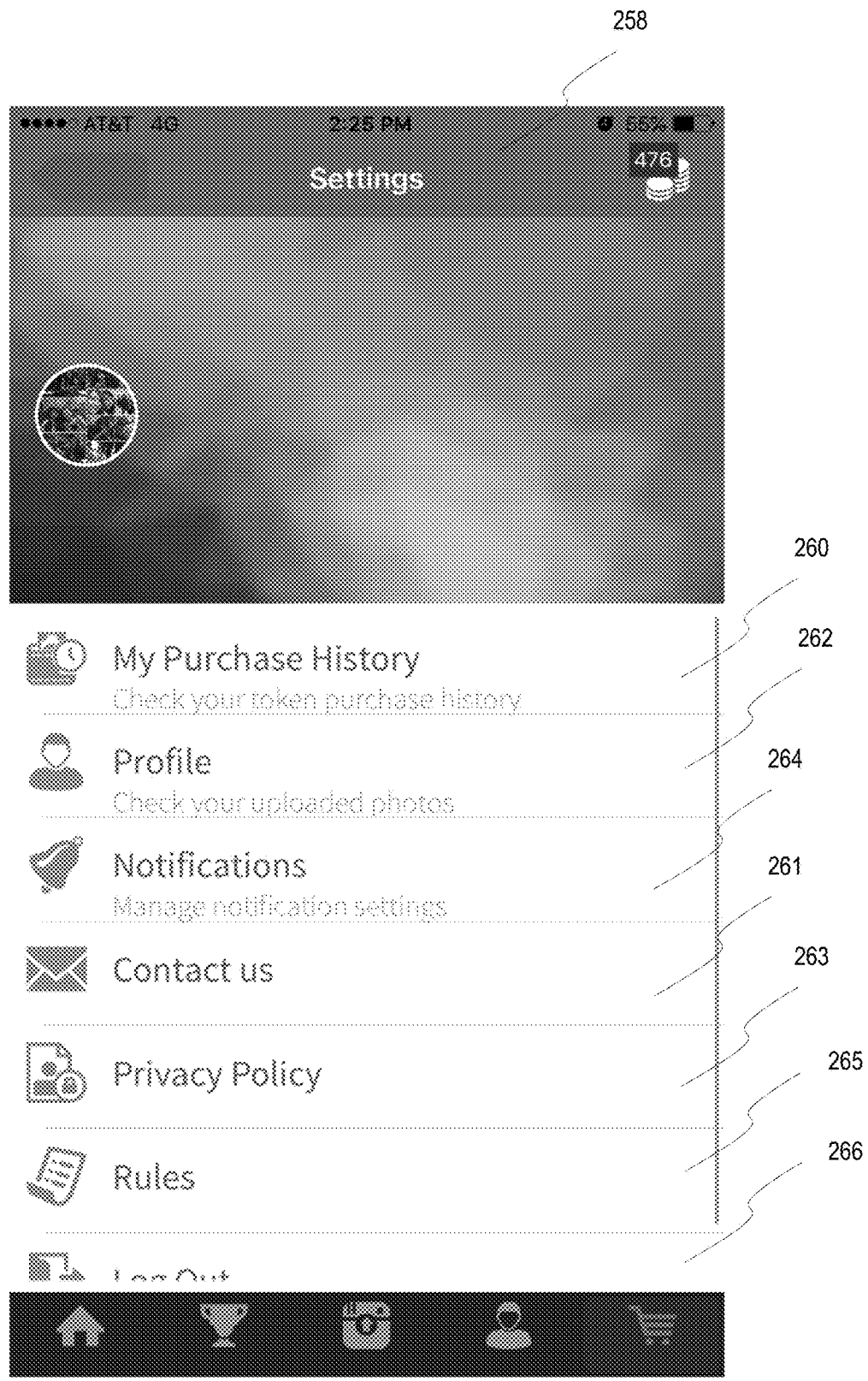
FIG. 10 is a representation of a screen display for user settings.

FIG. 10 is a representation of a screen display 258 for user settings. Users can view their "My Purchase History" 260 to check their token purchase history, view their "Profile" 262 to check their uploaded photos, view their "Notifications" 264 to manage their notification settings, contact by selecting "Contact us", view a privacy policy by selecting "Privacy Policy" view rules by selecting "Rules" 265 or choose to "Log Out" 266.

Figure 11:
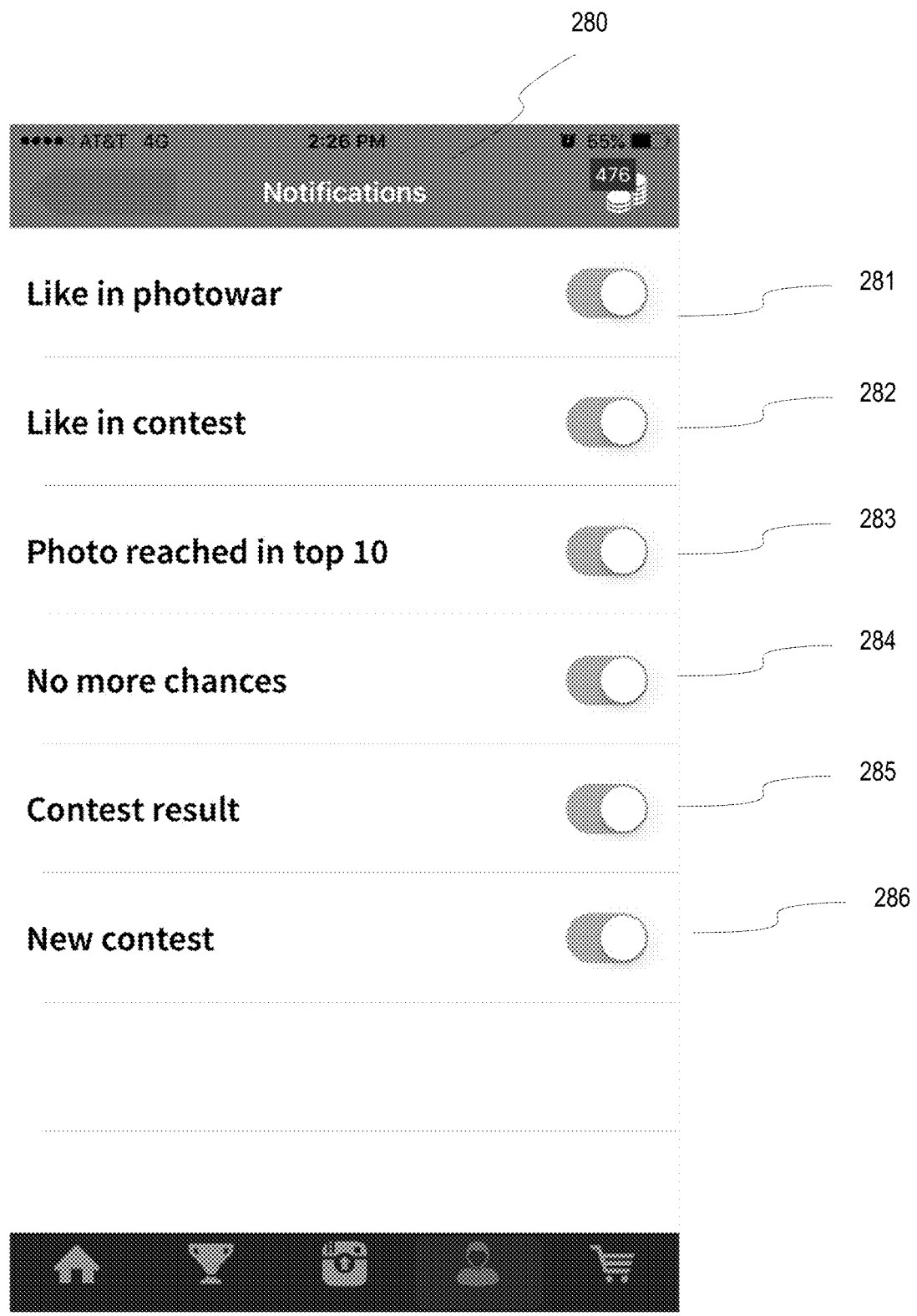
FIG. 11 is a representation of a screen display showing notification settings.

FIG. 11 is a representation of a screen display 280 showing notification settings. A user may determine what notifications they wish to receive. This may include a "Like in photowar" notification 281, a "Like in contest" notification 282, a "Photo reached in top 10" notification 283, a "No more chances" notification 284, a "Contest result" notification 285, and a "New contest" notification 286. Although various examples of notifications are shown, it is to be understood that other types of notifications or alerts may also be present.

Figure 12:
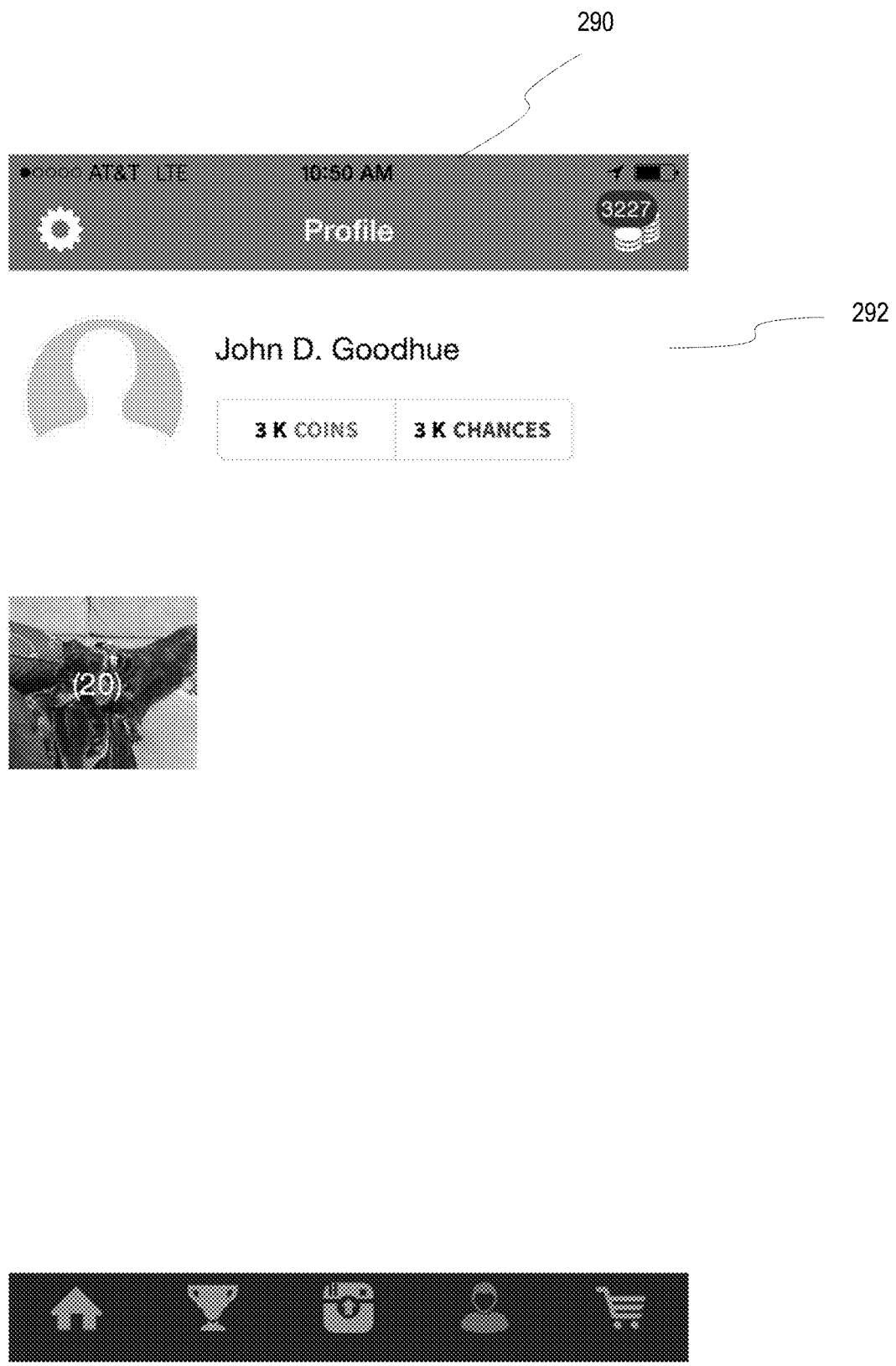
FIG. 12 is a representation of a screen display showing a user's profile.

FIG. 12 is a representation of a screen display 290 showing a user's profile. The user profile includes profile information 292 which may include a person's name, the number of coins they have, and the number of chances they have. Below the profile information, one or more photos which have been submitted by the person may be shown as well as the number of available chances.

Figure 13:
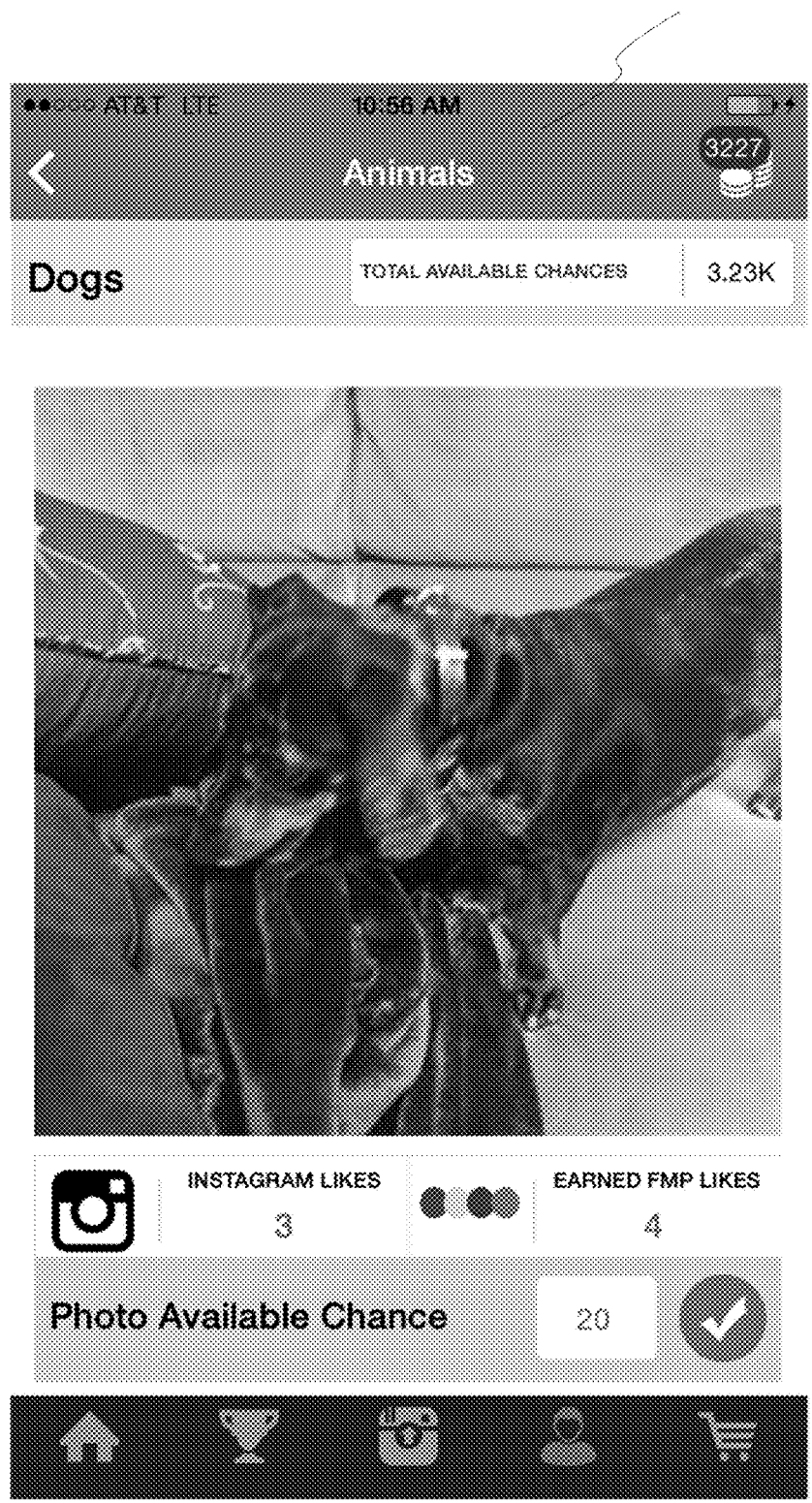
FIG. 13 is a representation of a screen display in which a user can view a photo which they have submitted and the number of available chances and the number of likes.

FIG. 13 illustrates a screen display 294 showing one of the photos which a user has submitted. The number of available chances for the photo are shown as well as the number of Instagram likes and an earned number of FMP likes.

Figure 14:
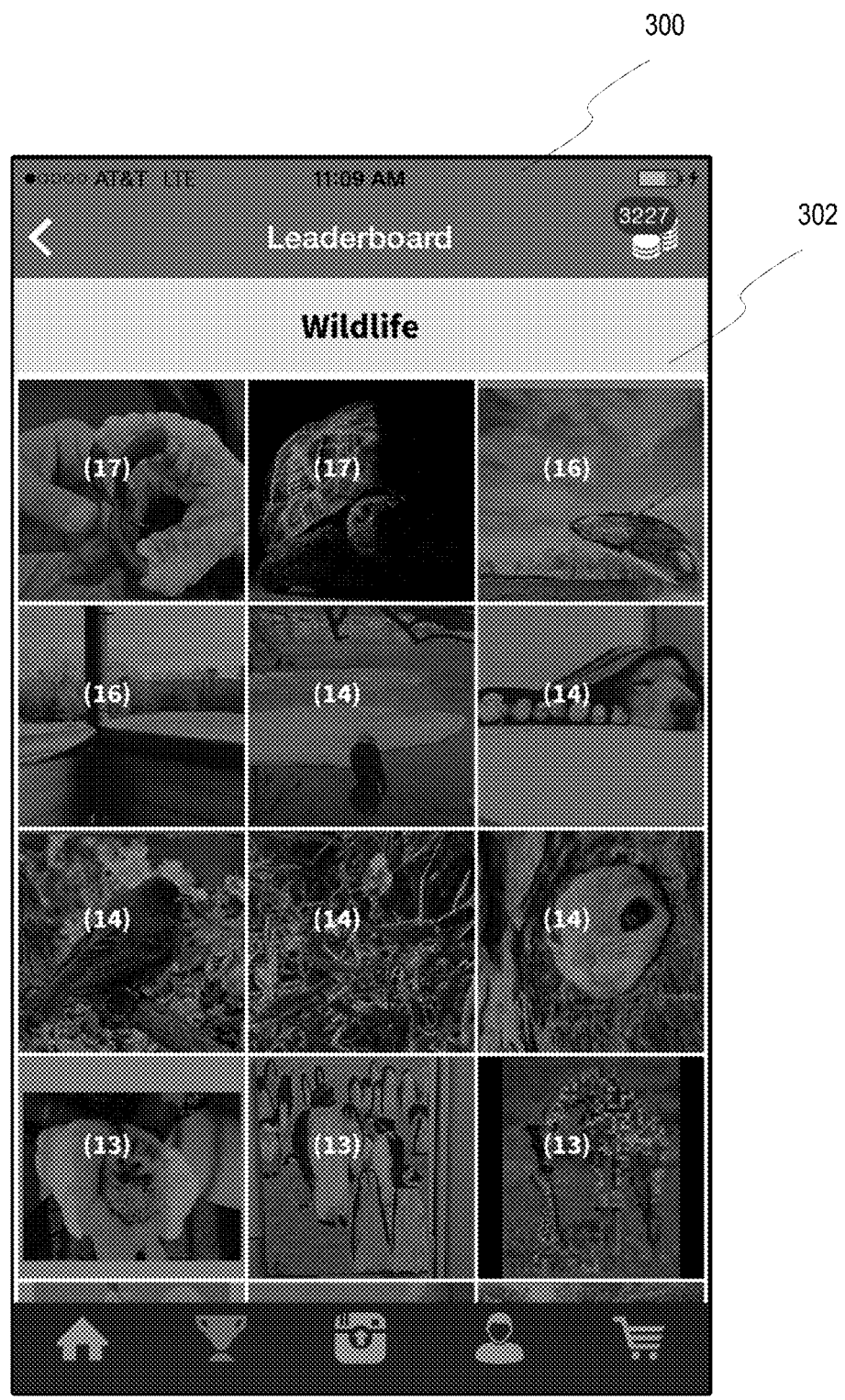
FIG. 14 is a representation of a screen display with a leaderboard.

FIG. 14 is a representation of a screen display 300 with a leaderboard 302. When a user goes to the leaderboard 302 they may select any picture, view the picture, and vote on the picture. The pictures are ranked with the highest number of votes on top to the least number of votes on the bottom. This information is generated from the contest side of the app. When the contest runs out the pictures will no longer be present on the app. If a user who submits a picture in a contest wants to be notified that they have won a contest they may be so notified.

The present invention may also provide means for an administrator to control or make adjustments to the service. This may take on any number of forms. One method is to provide a website for performing administrative functions such as creating new contests, managing user accounts, defining categories and the like. It is contemplated that relevant information may be modified in databases which are accessed by the app previously described.

Figure 15:
FIG. 15 is a representation of a screen display with an administrator panel.

FIG. 15 is a representation of a screen display 400 with an administrator panel. The administrator panel may include a list of recent winners, a list of recent photos, and a dashboard 408. The dashboard 408 may inform an administrator of information such as the total number of contests, the total number of registered users, the total number of photos uploaded, and the total number of photo categories. Administration functions may include such features as the dashboard, global settings, manage admin users, manage categories, manage contests, manage packages, manage users, manage abused photos, and provide reports and statistics.

Figure 16:
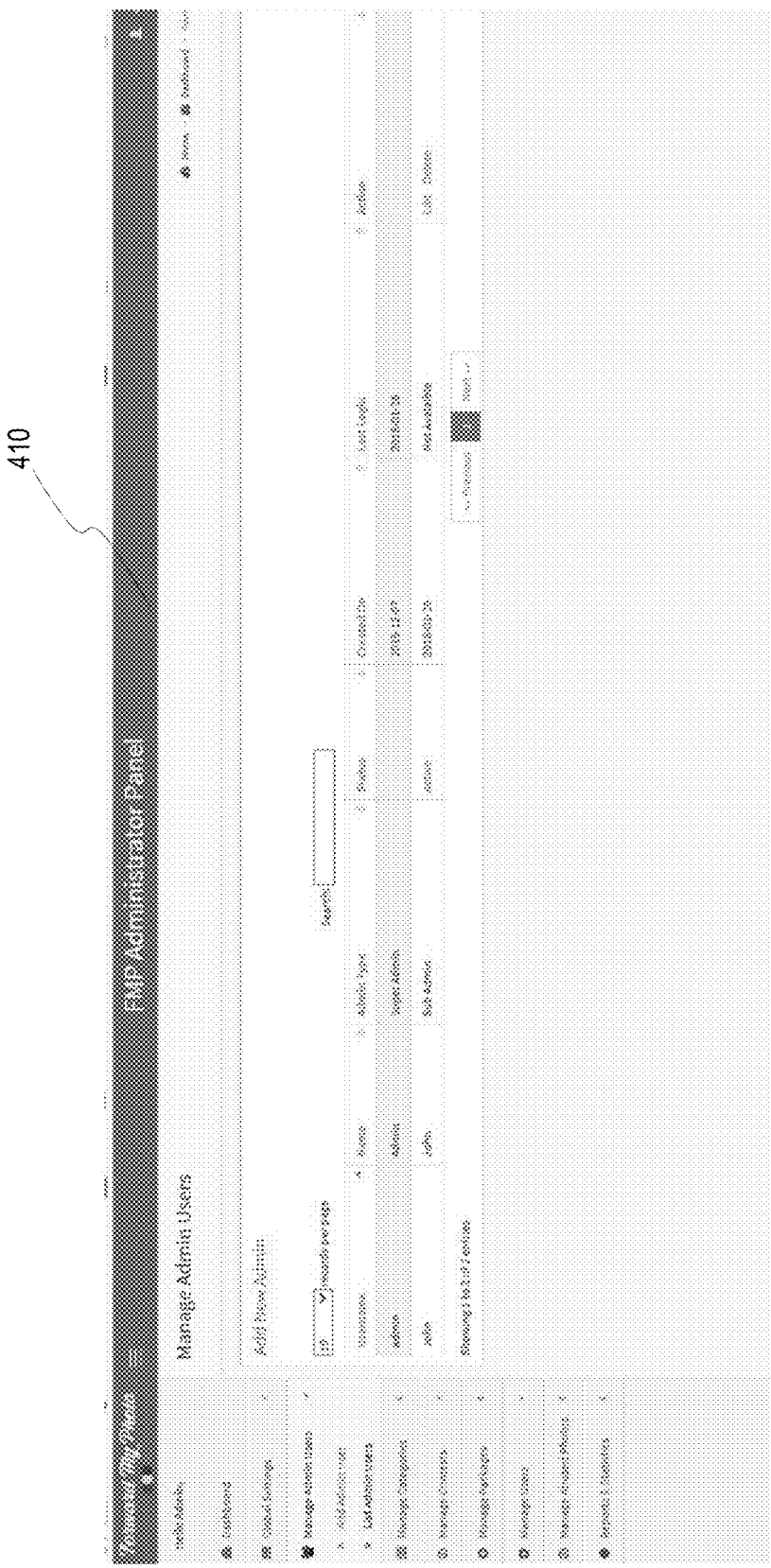
FIG. 16 is another representation of a screen display with the administrator panel which allows for management of administrator users.
Figure 17:
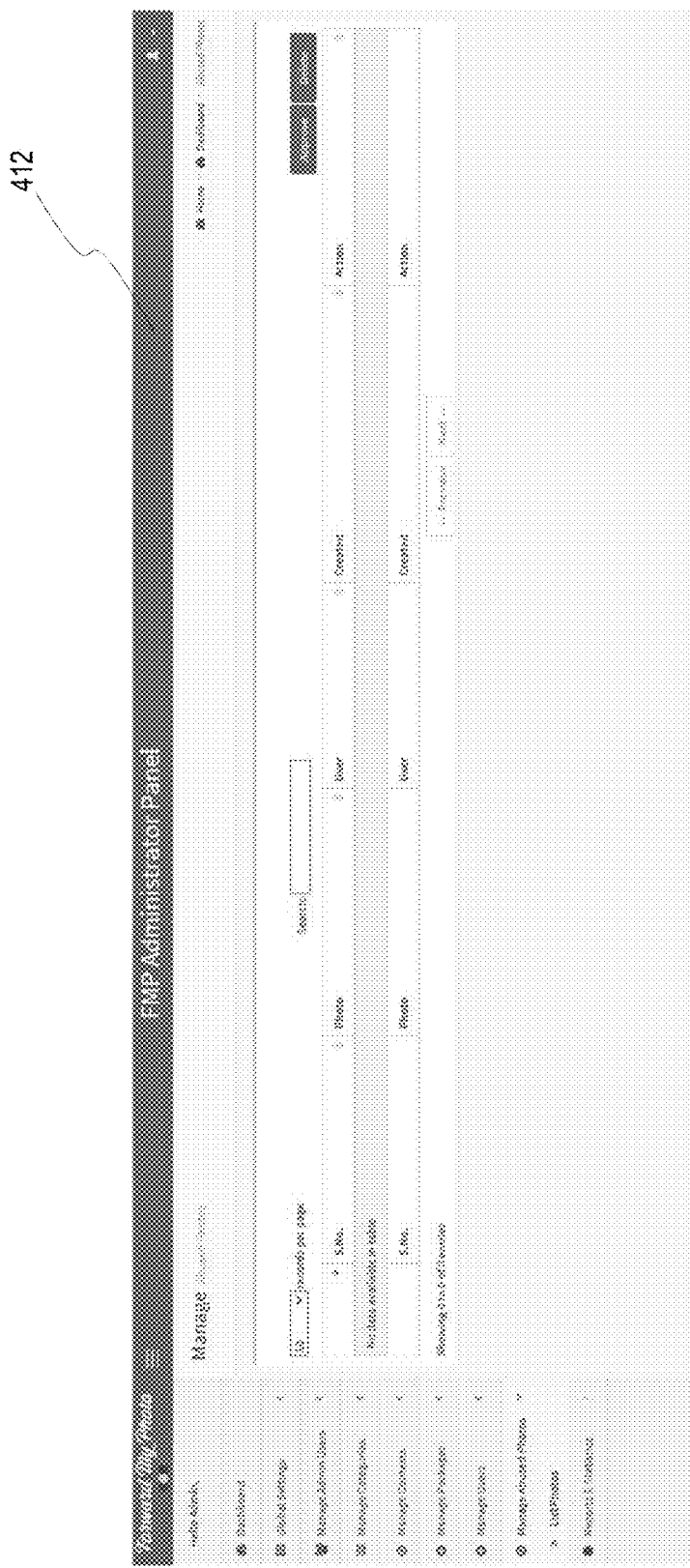
FIG. 17 is a representation of a screen display which allows an administrator to manage abused photos.
Figure 18:
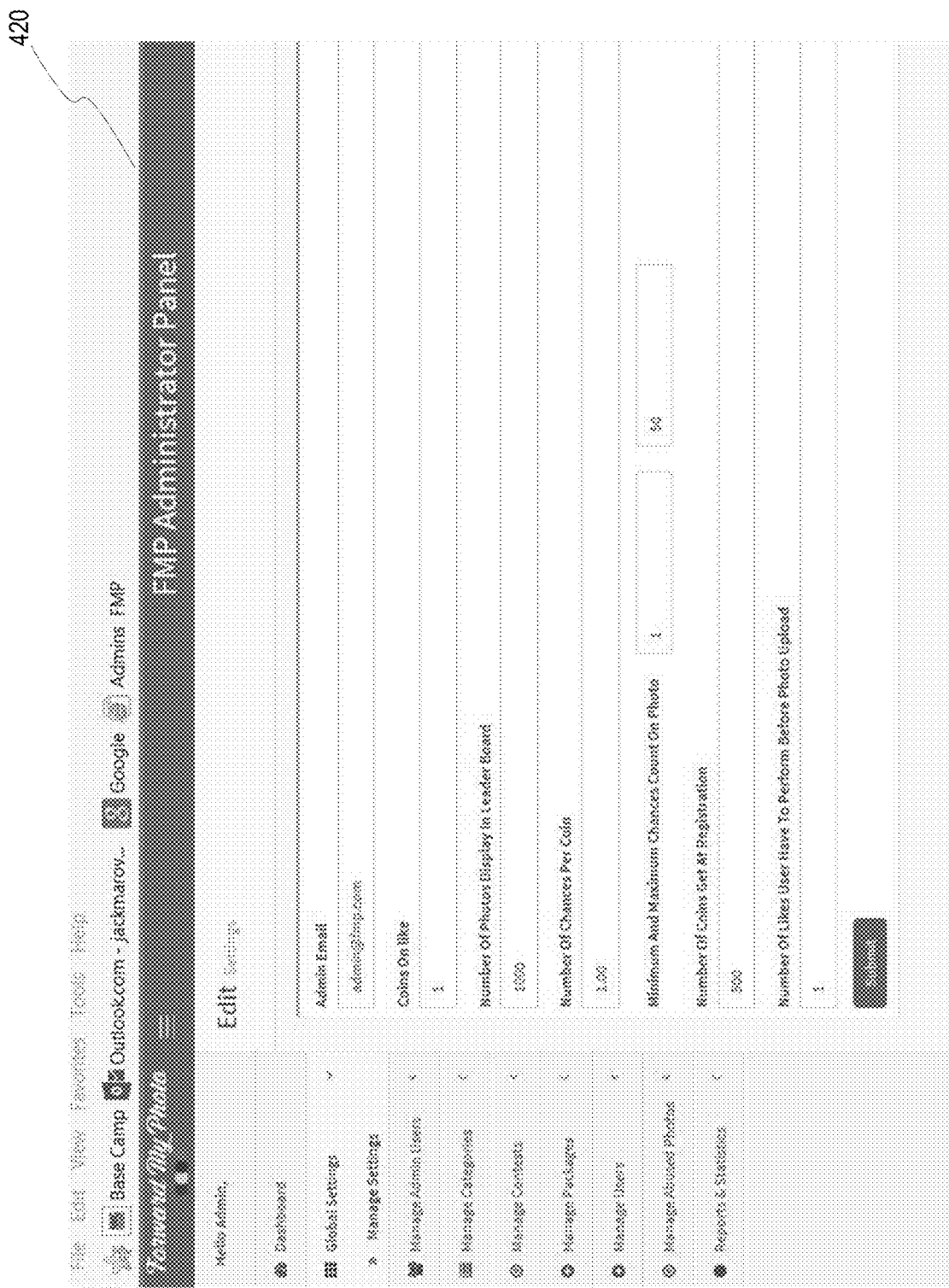
FIG. 18 is a representation of a screen display which allows an administrator to edit settings.
Figure 19:
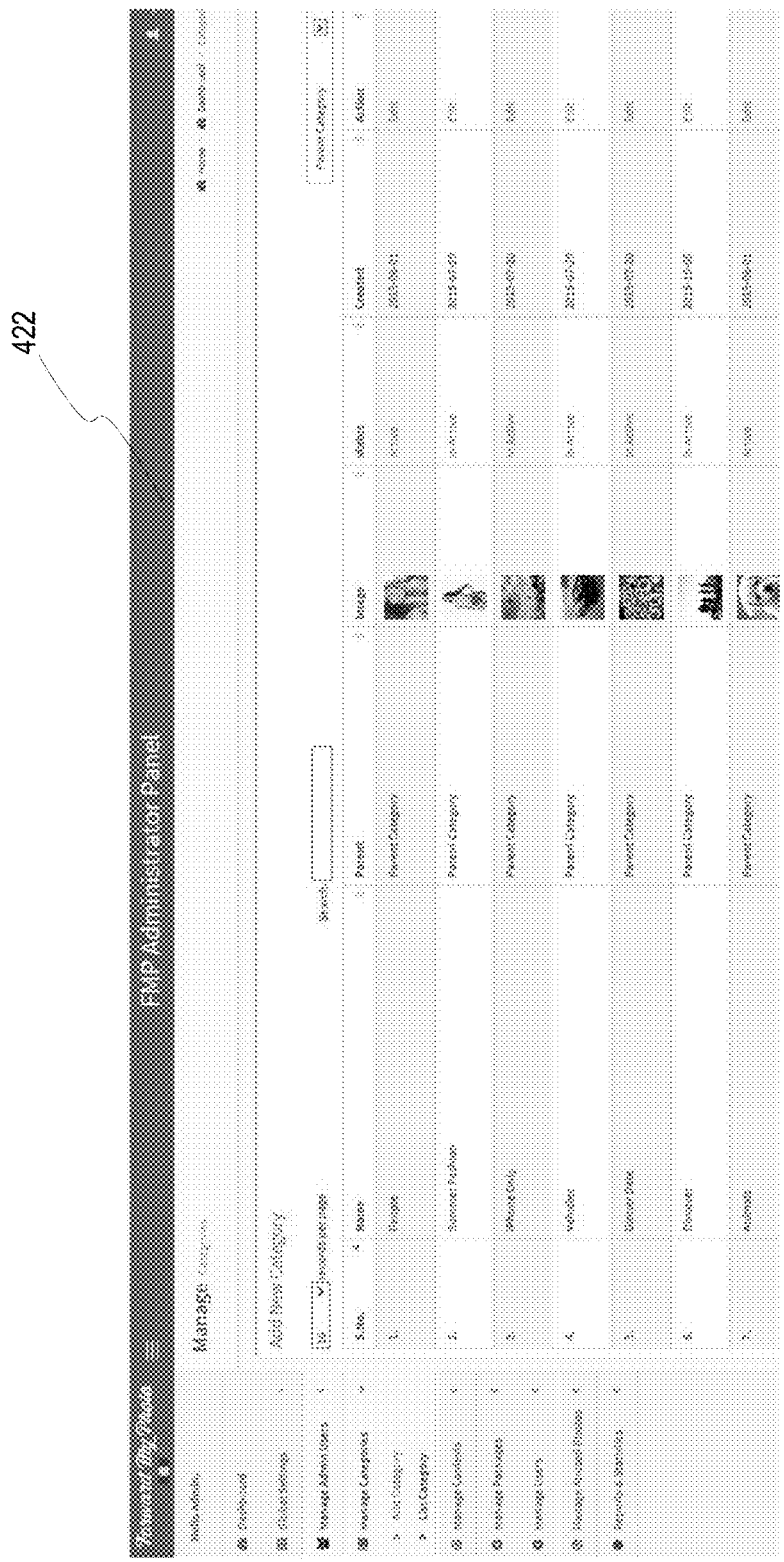
FIG. 19 is a representation of a screen display which allows an administrator to manage categories such as adding and/or deleting categories.
Figure 20:
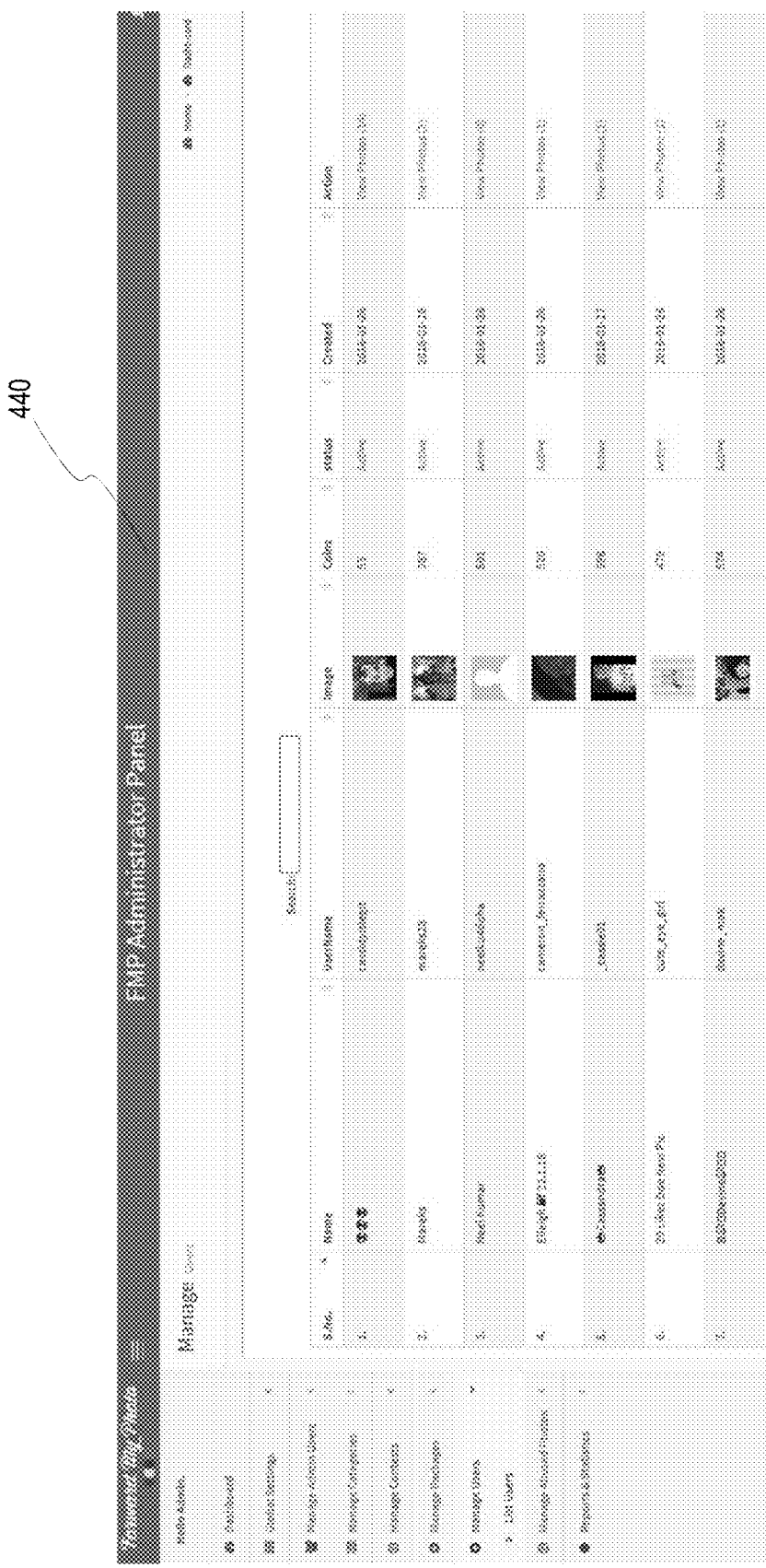
FIG. 20 is a representation of a screen display which allows an administrator to manage users.
Figure 21:
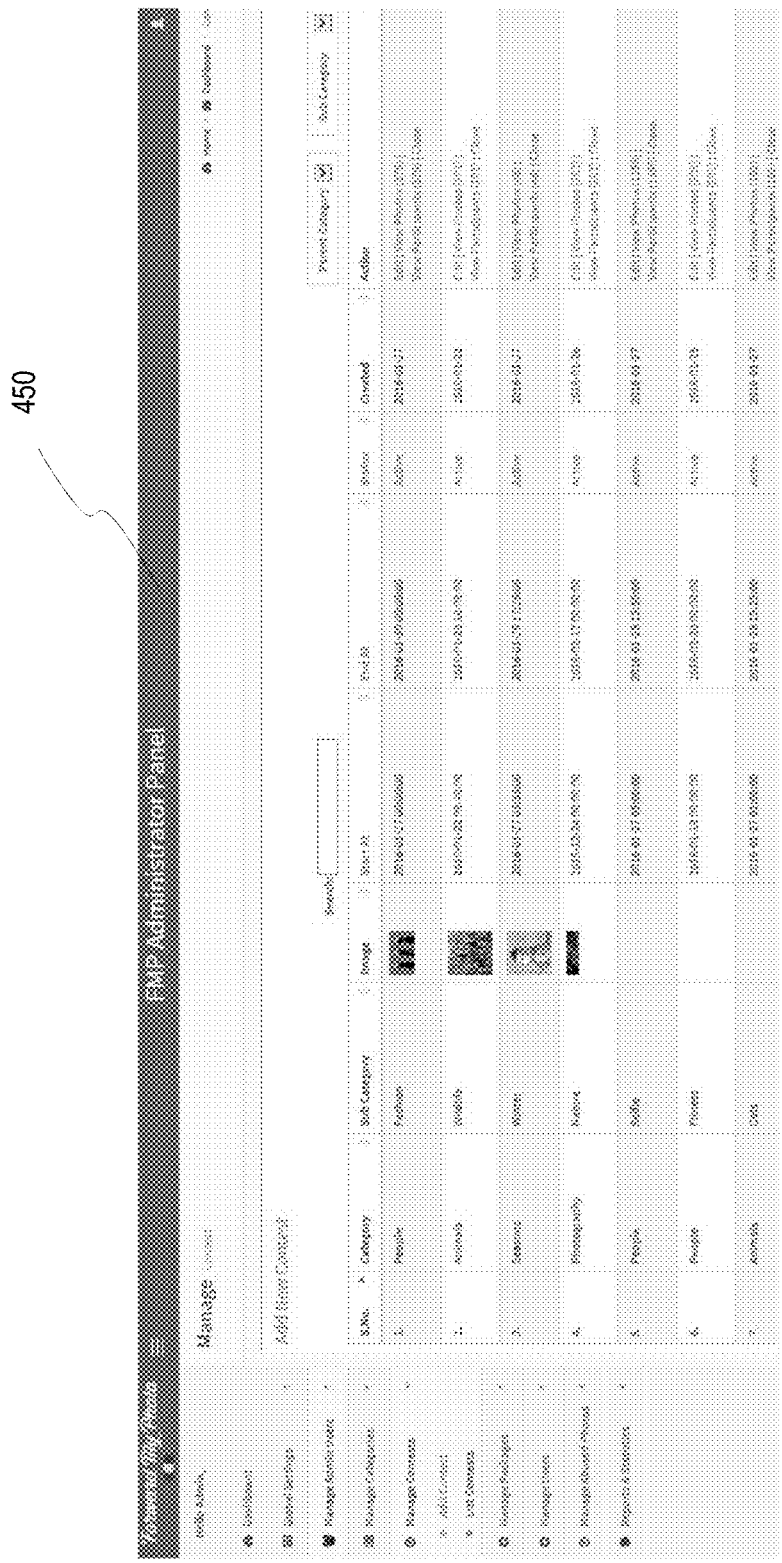
FIG. 21 is a representation of a screen display which allows an administrator manage contests.
Figure 22:
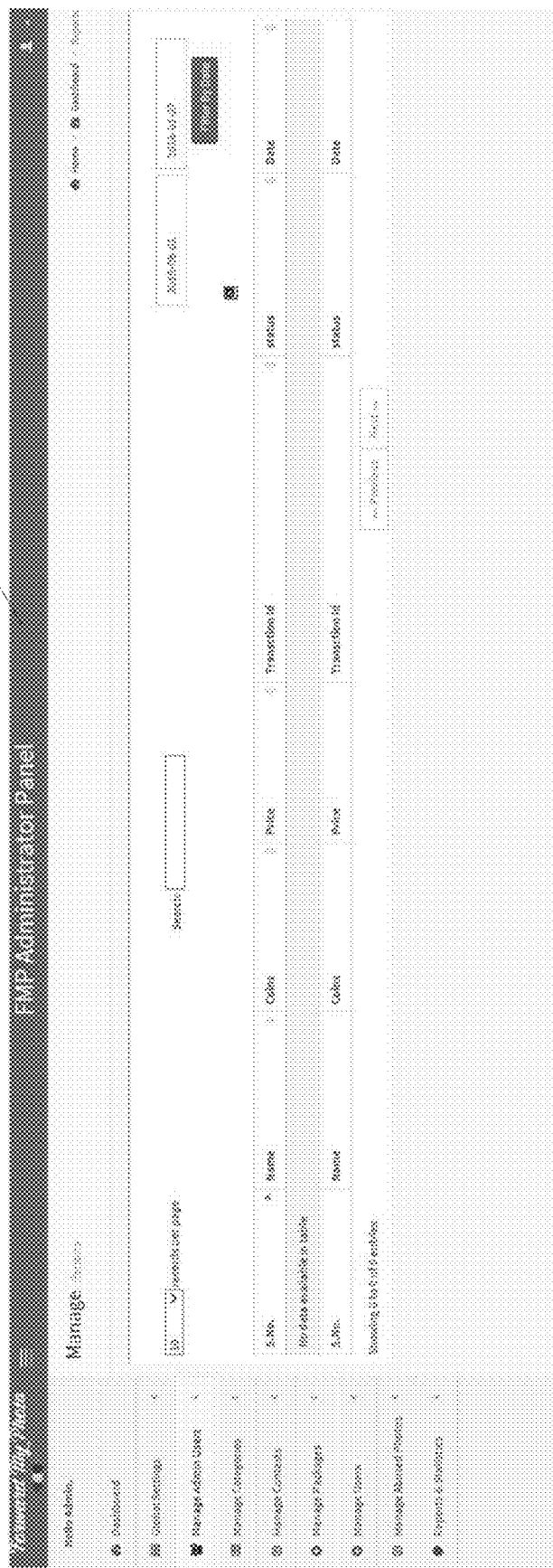
FIG. 22 is a representation of a screen display which allows an administrator to manage reports.

FIG. 16 is another representation of a screen display 410 with the administrator panel and showing the management of admin users. FIG. 17 is another representation of a screen display 412 with the administrator panel and showing the management of abused photos. Thus, if users violate the terms of conditions for the app and submit content inconsistent with rules or guidelines the posting of these photos may be denied. FIG. 18 is another representation of a screen display 420 with an administrator panel which allows setting information to be updated. FIG. 19 is a representation of a screen display 422 which allows an administrator to add and/or delete or otherwise manage categories. FIG. 20 is a representation of a screen display 440 which allows an administrator to add or remove users or otherwise manage users. FIG. 21 is a representation of a screen display 450 which allows an administrator to add a new contest such as by specifying a parent category, sub category, an image, start date, end date, description, and/or other information. FIG. 22 is a representation of a screen display 480 which allows an administrator to manage reports.

Figure 23:
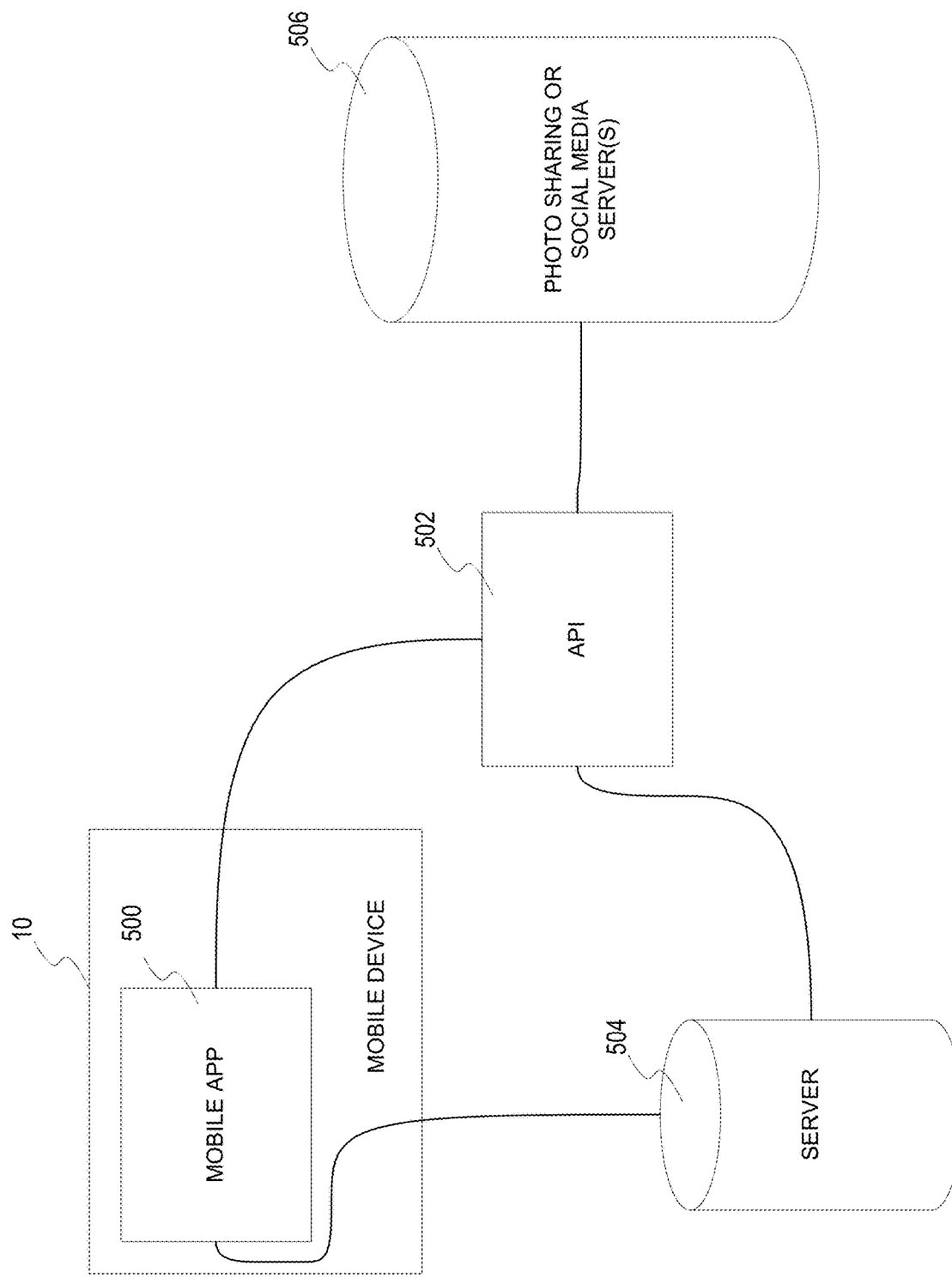
FIG. 23 is a block diagram of one example of a system of the present invention.

FIG. 23 is a block diagram illustrating a mobile app 500 executing on a processor of a mobile device 10 such as a phone, tablet, or other computing device. The mobile app 500 may be in operative communication over a network with one or more servers 504 used for administering aspects of the mobile app. An application programming interface (API) is in operative communication with the mobile app 500 and/or software executing on the server 504. The API 502 is also in operative communication with a photo sharing, media sharing, or social media server(s) 506. Thus, in operation the mobile app may retrieve photos or other media from a user's account on the photo sharing or social media server(s) 506. Thus, media need not be separately stored on the server 504.

Numerous variations, options, and alternatives are contemplated. For example the entertainment aspect may be extended further for those who wish to gamble on their photos being more popular than other photos. For example, an additional category may be added which allows a user to upload a photo and select the number of coins they want to bet. Then the system selects a photo to go against the uploaded photo from similar subject matter or categories/sub-categories. The two photos go head-to-head in photo wars and the 'Winner receives the coin point. The user uploading the photo can let it ride or double or nothing. If the game is extending, the system will select another photo from a like category that has more likes for the purpose of winning the photo war.

According to another variation, it is contemplated that the system can be a platform where businesses that sell products may upload representations of their products to receive feedback on consumer preferences. For example, a company who sells watches may upload images of multiple different watches and allow users to like/vote for the different images. It is contemplated that this is a further method which may be used to monetize the platform while also maintaining entertainment value for users. It is further contemplated that uploaded images or videos may also have associated links to sellers of the content. Thus, in this example not only could a user vote on a photo containing a watch but they could also purchase the watch that they wanted. In another example, instead of evaluating products, images or videos used for advertisements may be submitted and users can vote on which of these advertisements they prefer.

Therefore a service has been described for sharing and evaluating photos. It is to be understood that although the terms "photo" and "picture" have been used it is to be understood any type of image may be used in any number of formats. In addition or instead of images, it is contemplated that other type of imagery may be used such as video or animations as well as other types of user content, especially user content which includes visual content.

What is claimed is:

1. A method for providing a service for image sharing and feedback, the method comprising:
providing a software application to execute on a computing device wherein the software application includes a photo war component and a photo contest component;
executing instructions for the photo war component where the instructions present users a user interface to display a first set of multiple photos and receive a selection of only one of the multiple photos within the first set of multiple photos from each of the users;
executing instructions for the photo contest component where the instructions present users a second set of multiple photos one photo at a time and present a user interface for a photo contest providing an up vote and a down vote for each of the second set of multiple photos;
executing instructions to receive selections for the photos from the first set of multiple photos and votes from the second set of multiple photos; and
generating likes on a social media platform for photos based on selections for the photo received within the photo war component and up votes received for the photo receiving through the photo contest component;
wherein the photo war component further provides for assigning an initial number of chances for each of the multiple photos and reducing a number of chances in a corresponding user account based on the initial number of chances, increasing the chances each time each of the photos is selected and decreasing the chances each time each of the multiple photos is not selected.

2. The method of claim 1 further comprising removing each of the multiple photos from the photo war component when the chances are reduced to zero.

3. The method of claim 1 further comprises providing a token component wherein the token component allows users to be rewarded one or more additional tokens for participating in the photo war component or the photo contest component.

4. The method of claim 3 wherein the token component provides for purchasing additional tokens.

5. The method of claim 3 wherein the software application provides for redeeming tokens to purchase additional chances for use in the photo war component.

6. The method of claim 1 wherein the generating likes on the social media platform is performed through an API of the social media platform.

7. The method of claim 1 wherein the photo war component allows for a user to determine a number of tokens to bet on the photo.

8. The method of claim 1 wherein the software application accesses the photos from a social media platform.

9. A method for providing a platform for image sharing and feedback, the method comprising of:
providing a software application stored in a non-transitory computer readable media to execute on a computing device wherein the software application provides instructions for a photo war component by:
receiving a photo from the user;
assigning an initial number of chances to the photo and storing a representation of the initial number of chances to the photo in a memory;
presenting the photo with at least one other photo to other users in a photo war and receiving a selection of the photo or a selection of at least one other photo;
if the photo is selected then increasing the number of chances for the photo stored in the memory and if the at least one other photo is selected decreasing the number of chances for the photo stored in the memory;
if the number of chances is reduced to zero then removing the photo from the photo war;
generating likes on a social media platform for photos based on selections for the photo received within the photo war component and up votes received for the photo receiving through the photo contest component, wherein the platform for image sharing and feedback is in operative communication with the social media platform via an API;
wherein the software application provides instructions for a photo contest component by:
presenting the photo individually to users of the platform; and
receiving either an up vote or a down vote from each of the users of the platform.

10. The method of claim 9 further comprising providing the user with an opportunity to obtain additional chances.

11. A method for providing a platform for photo sharing and feedback, using a software application executing on a computing device, the software application comprising a plurality of instructions for providing a photo war component and a photo content component, the plurality of instructions configured to implement the photo war component by:
receiving over a network a photo from the user;
assigning an initial number of chances to the photo and storing the initial number of chances in a memory;
presenting the photo with at least one other photo to other users in a photo war and receiving a selection of the photo or a selection of at least one other photo;
if the photo is selected then increasing the number of chances stored in the memory for the photo and if the at least one other photo is selected decreasing the number of chances stored in the memory for the photo;
if the number of chances is reduced to zero then removing the photo from the photo war;
providing a token component wherein the token component allows users to be rewarded one or more additional tokens for participating in the photo war;
allowing the user to determine a number of tokens to bet on the photo prior to starting the photo war;
redeeming tokens to purchase additional chances for use in the photo war;
awarding each of the other users one or more tokens for participating in the photo war;
generating likes on a social media platform for photos based on selections for the photo received within the photo war component and up votes received for the photo receiving through the photo contest component, wherein the platform for image sharing and feedback is in operative communication with the social media platform via an API;
the plurality of instructions configured to implement the photo contest component by:

presenting the photo individually without competing photos to users of the platform;

receiving either an up vote or a down vote from each of the users of the platform for the photo.

* * * * *